G. Clapp,
Fruit Crate.
No. 109,175.      Patented Nov. 15, 1870.
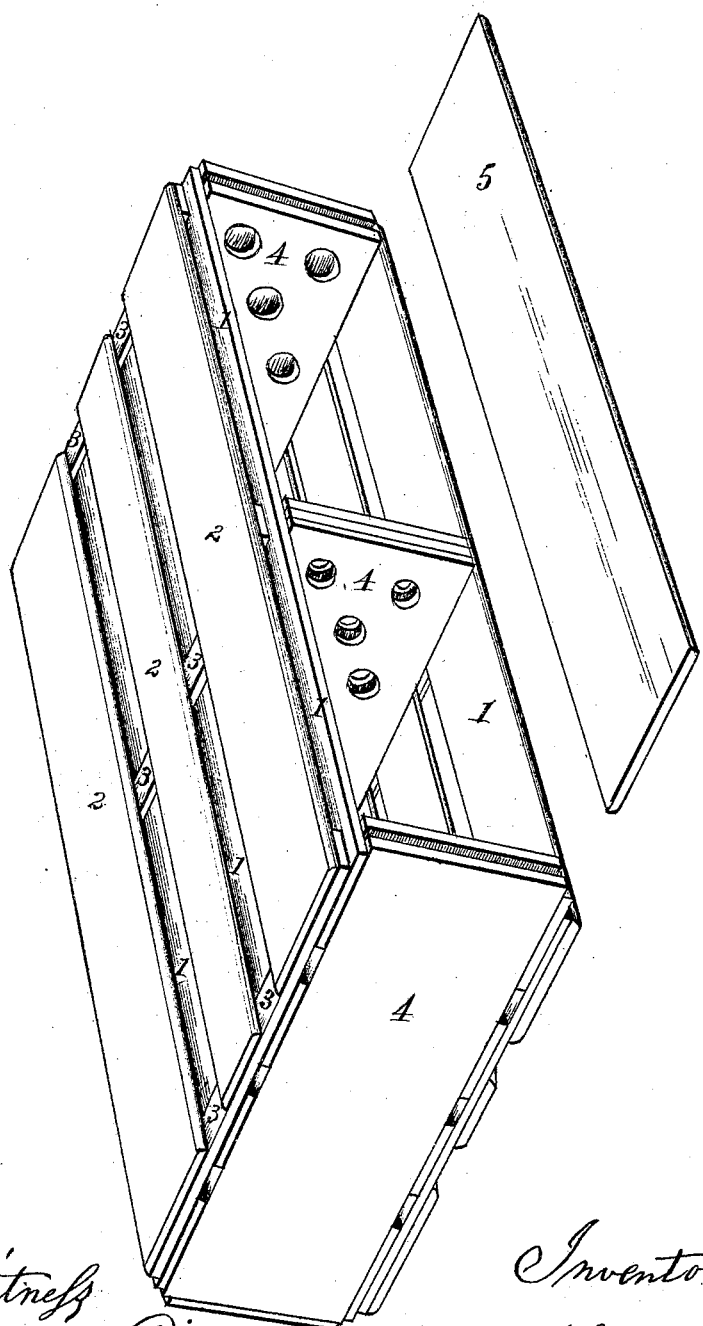
Witness
Charles H. Parker
Terence E. McDonough
Inventor
George Clapp

United States Patent Office.

GEORGE CLAPP, OF GENEVA, NEW YORK.

Letters Patent No. 109,175, dated November 15, 1870.

IMPROVEMENT IN FRUIT-CRATES.

The Schedule referred to in these Letters Patent and making part of the same.

*To all whom it may concern:*

Be it known that I, GEORGE CLAPP, of Geneva, Ontario county and State of New York, have invented a new and useful Improvement in Fruit-Crates, for the safer transportation of all kinds of fruit, &c.; and I do hereby declare that the following is a full and exact description thereof.

Figure 1 of the drawing represents the ordinary crate in use for packing fruits, as represented in drawing.

Figure 3 represents longitudinal slats, two or more to be nailed or attached to each end and center partition or partitions, as the size of the crate may require.

Figure 4 represents slats, fig. 3, to be one-fourth of one inch in thickness or more, giving an opening between longitudinal and horizontal slats, preventing the contents from compression and loss by decay, and giving free circulation of air to each crate, for the safer preservation of its contents.

This attachment is but a small additional expense to the crate now in use.

Figure 2 represents horizontal slats, two or more, as the size of the crate may require, nailed or attached to the longitudinal slats, the center of each horizontal slat to correspond with the center of the openings in the ordinary crates that are now in use, all of which are attached and cover the openings between slats, fig. 1, as is more fully represented by the drawing that accompanies this document.

Figure 4 represents ends and partitions to the crate.

Figure 5 represents cover.

What I claim as my invention and improvement in fruit-crates, in combination with the crate, is—

The attachment of the parts or slats Nos. 2 and 3, in the manner shown and described.

GEORGE CLAPP.

Witnesses:
SAMUEL SOUTHWORTH,
CHARLES H. RUSH.